Patented Mar. 11, 1952

2,589,195

UNITED STATES PATENT OFFICE 2,589,195

PROCESSES FOR INHIBITING SCALE DEPOSITION

Louis T. Monson, Alhambra, Calif., assignor to Petrolite Corporation, Ltd., Wilmington, Del., a corporation of Delaware No Drawing. Application March 14, 1949, Serial No. 81,401

22 Claims. (Cl. 210—23)

This invention relates to a process for removing from surfaces, particularly from pipes and other processing equipment, deposits of inorganic solids arising from the passage of aqueous media therethrough, and for inhibiting and preventing the accumulation of such deposits at such places. My process is particularly adapted for use in equipment used in producing and handling crude oil, since the water produced from the earth along with the oil often deposits inorganic solids as a scale in the well tubing, or, more commonly, in traps, heaters, or other surface equipment, and in some instances even in pipelines. My process is likewise valuable in controlling deposits or scales of such inorganic solids which may accumulate in steam-generating equipment if somewhat hard waters are used. Utility of my process is not limited to such characteristic applications; it may be used in other instances where scales or deposits of inorganic solids originating from naturally-occurring constituents of aqueous media constitute a nuisance in industrial or other activities.

The scales or deposits of inorganic solids that occur in hard water with which this invention is concerned are clearly to be distinguished from accumulations of solid organic matter, whose removal is the subject-matter of my co-pending application, Serial No. 719,926, filed January 2, 1947, now Patent No. 2,470,831, dated May 24, 1949.

The accumulations with which the present invention is concerned are also to be distinguished at the outset from accumulations of mud solids in the form of mud sheaths, the removal of which is the subject-matter of my co-pending application, Serial No. 719,925, filed January 2, 1947, now Patent No. 2,470,830, dated May 24, 1949. Mud sheaths are essentially filter cakes of water-insoluble solids of natural clay solids or of barite, iron oxide, bentonite, or other inorganic solids used in preparing and conditioning drilling mud and originally present as an aqueous suspension. The inorganic solids with which the present invention is concerned may be thought of as being originally water-soluble inorganic solids, which have been precipitated as "hard-water scale" by the application of heat, the loss of carbon dioxide or some other constituent, or in some cases by the chilling of the aqueous medium as it passes through the conduit or apparatus which exhibits the scaling, etc. Accumulations of such solids are recurring problems.

The process which constitutes my invention consists in applying, to inorganic solid deposits of the kind described, a chemical reagent of the kind described below, to the end that such inorganic solids are removed from the surfaces to which they originally adhered. By such means, the capacity of pipes, towlines, pipelines, traps, tanks, pumps, and other equipment supporting such deposits is materially increased. The exact nature of the action taking place when my reagents are used is unknown to me. It does not appear to be a true solution process, however, for a number of reasons.

It will be apparent that if my reagents are applied to a system which periodically accumulates such deposits of inorganic solids, before appreciable deposition has occurred, and if such application of reagents is practised continuously or with sufficient frequency, the operation may be considered a preventive process rather than a corrective one. If applied in somewhat insufficient quantity to a deposit already accumulated, it may accomplish partial reduction of such deposit, rather than complete removal. My process is therefore both a preventive and a corrective one, and may be applied in either sense, to achieve the same ultimate goal, viz., improvement of the capacity of conduits through which fluids are passed.

Throughout this specification, therefore, I intend to say that my process is equally applicable to systems in which a deposit of inorganic salts is already in existence and to systems which are potentially susceptible to such deposition. When I have used the word "inhibiting," I mean to include therein the prevention, reduction, and removal of such deposits of inorganic solids.

The reagents which I employ in practising my process include a basic acylated aminoalcohol in which an acyloxy radical derived from a detergent-forming acid having from 8 to 32 carbon atoms is joined to a basic nitrogen atom by a carbon atom chain, or a carbon atom chain which is interrupted at least once by an oxygen atom, said acylated aminoalcohol being usually used diluted with a suitable diluent, such as water or a water-insoluble organic liquid capable of acting as an oil solvent.

In treating systems in which oil is present, I prefer to mix the acylated aminoalcohol with a water-insoluble organic liquid capable of acting as an oil solvent, and to employ such mixture in the form of a relatively stable aqueous dispersion. By "relatively stable aqueous dispersion," I mean one that is not resolved into its components spontaneously, on standing for protracted periods of time, e. g., for more than one hour. However such preferred mixture may be employed undiluted or dispersed in oil. The acylated aminoalcohol may be mixed with water, especially if in salt form, to produce a relatively stable aqueous dispersion, and may be used as such or diluted further with water. In general, I believe the form of the reagent in which a water-insoluble organic liquid is incorporated gives superior results, at least where the system to be treated includes oil.

The basic acylated aminoalcohol employed in the present process includes an acylated derivative of a basic aminoalcohol of the formula:

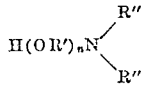

said derivative being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; and $n$ is a small whole number varying from 1 to 10; RCO being a substituent for a hydroxyl hydrogen atom; and the molecular weight of said compound being at least 273 and not over 4,000, the preferred compound having a molecular weight not exceeding 1,000. The aminoalcohols may have more than one amino radical, or, for that matter, more than one basic amino radical. They are, to state it another way, esters of aminoalcohols which may contain ether linkages as well as more than one amino nitrogen atom. They are well-known compounds and are produced by conventional procedures.

The phrase "basic amino nitrogen atom" is used in its conventional sense. See, for example, "Textbook of Organic Chemistry," Richter, second edition, page 253.

Reference to an amine and the subsequent amino compounds is intended to include the salts and the anhydro base. In instances where water is present, the term includes the hydrated base as well. Both the anhydro base and the hydrated base are obviously present when an aqueous system is being subjected to the reagent, or when the reagent is used as a water solution or dispersion. ("In an aqueous solution of the amine, the anhydro base, R—NH$_2$, the hydrated base, R—NH$_3$OH, and the two ions are all present." Richter, s. v., page 252.)

As previously stated, the acylated aminoalcohols with which the present process is concerned are old and well-known products, requiring no extensive discussion. For convenience and for purpose of brevity, reference is made to the following three U. S. patents to De Groote and Keiser, to wit: Nos. 2,324,488, 2,324,489, and 2,324,490, all dated July 20, 1943. Said patents are concerned with processes for breaking water-in-oil emulsions. The demulsifying agent employed is in each instance the resultant derived by reaction between a certain fractional ester and an acylated aminoalcohol. The aminoalcohols described collectively in the aforementioned three patents are used as reactants for combining with a fractional acidic ester. Thus, said aminoalcohols must have present an alcoholiform hydroxyl as part of an acyl radical, or as part of a substituent for an amino hydrogen atom. In the instant case, such aminoalcohols are not employed as reactants, except as to salt formation reactions, and the hydroxyl group is not functional. Thus, one may employ, not only the aminoalcohols described in the three aforementioned United States patents, but also the obvious analogues in which there is no hydroxyl radical present. Subsequent reference will be made to this particular type and examples will be included.

The monocarboxy detergent-forming acids from which the acyl radical, RCO, of my acylated aminoalcohols is derived contain from 8 to 32 carbon atoms. They combine with alkali to produce soap or soap-like materials. They include fatty acids, rosin acids, petroleum acids, etc.; and all may be indicated by the formula R.COOH. The obvious equivalents of such acids, such as the halogenated or other derivatives retaining the carboxyl group, may be employed. The petroleum acids which may be employed include not only the naturally-occurring naphthenic acids, but also acids produced by oxidation of wax, paraffin, etc., as in U. S. Patent No. 2,242,837 to Shields, dated May 20, 1941.

The acylated aminoalcohol with which the present process is concerned is preferably derived from unsaturated fatty acids having 18 carbon atoms. Such unsaturated fatty acids include oleic acid, ricinoleic acid, linoleic acid, linolenic acid, etc. One may employ mixed fatty acids, as, for example, the fatty acids obtained from hydrolysis of cottonseed oil, soyabean oil, etc. I prefer to employ C$_{18}$ unsaturated acids containing a hydroxyl group. The whole class of high molal monocarboxy, detergent-forming acids is described in detail in aforementioned U. S. Patent 2,324,490.

As is well known, one need not use the high molal carboxy acid, such as a fatty acid, for introduction of the acyl group or acyloxy group. Any suitable functional equivalent such as the acyl halide, the anhydride, ester, amide, etc., may be employed.

The reagent employed in the present process includes an aminoalcohol ester, as described; and particular attention is directed to the fact that, although such esterified aminoalcohol need not contain a hydroxyl radical, my preferred form is the hydroxylated type. Other aminoalcohol esters of the kind herein contemplated are described in U. S. Patent No. 2,259,704, dated October 21, 1941, to Monson and Anderson.

In light of what has been said, it hardly appears necessary to include a list of reactants and reagents derivable therefrom. However, for convenience, the following amines are included. Suitable primary and secondary amines which may be employed to prepare suitable amino reactants, which latter are subsequently acylated to produce materials of the kind above described, include the following: Diethanolamine, monoethanolamine, ethylethanolamine, methylethanolamine, propanolamine, dipropanolamine, propylpropanolamine, etc. Other examples include cyclohexylolamine, dicyclohexylolamine, cyclohexylethanolamine, cyclohexyl propanolamine, benzylethanolamine, benzylpropanolamine, pentanolamine, hexanolamine, octylethanolamine, octadecylethanolamine, cyclohexanolethanolamine, etc.

Similarly, suitable tertiary amines which may be employed include the following: Triethanolamine, diethanolalkylamines, such as diethanolethylamine, diethanolpropylamine, etc. Other examples include diethanolmethylamine, tripropanolamine, dipropanolmethylamine, cyclohexanoldiethanolamine, dicyclohexanolethanolamine, cyclohexyldiethanolamine, dicyclohexylethanolamine, dicyclohexanolethylamine, benzyldiethanolamine, benzyldipropanolamine, tripentanolamine, trihexanolamine, hexyldiethanolamine, octadecyldiethanolamine, etc.

Additional amines include ethanoldiethylamine, propanoldiethylamine, ethanoldipropylamine, propanoldipropylamine, dibenzylethanolamine, etc. Ether-type aminoalcohols may be obtained from the above-mentioned aminoalcohols, for example, by treating them with one or more moles of an oxyalkylating agent, such as ethylene oxide, propylene oxide, butylene oxide, glycide, etc. It is to be noted that comparable products are obtained by treating primary or secondary amines other than arylamines with an olefine oxide. Aminoalcohols containing a primary or secondary amino group, i. e., having at least one or two amino hydrogen atoms present, may be employed under especially controlled conditions to give an ester, rather than an amide. One procedure is to permit amidification to take place and then cause a rearrangement to the ester form. See U. S. Patent No. 2,151,788, dated March 28, 1939, to Mauersberger.

AMINOALCOHOL ESTER

*Example 1*

One pound mole of ricinoleic acid is reacted with one pound mole of triethanolamine at approximately 180° to 240° C. for approximately 10 to 25 hours, until there is substantially complete esterification.

The ricinoleic acid may be replaced by methyl naphthenate, methyl abietate or ethyl oleate.

AMINOALCOHOL ESTER

*Example 2*

One pound mole of triethanolamine is reacted with one pound mole of ethylene oxide and the etherized amine so obtained is substituted for triethanolamine in Example 1.

Two to six moles of ethylene oxide may be employed instead of one mole, to produce other examples of such etherized amines.

AMINOALCOHOL ESTER

*Example 3*

One pound mole of castor oil is reacted with 3 pound moles of triethanolamine, as described in the aforementioned U. S. Patent No. 2,324,489, to De Groote and Keiser, under the heading "Intermediate Hydroxylated Amine, Example 1."

Additional examples are prepared in the manner previously described, except that one employs aminoalcohols obtained by the oxyalkylation of ethylene diamine; diamylamine; morpholine; 1,3-diamino-2-propanol; 2-amino-1-butanol; 2-amino-2-methyl-1-propanol; 2-amino-2-methyl-1,3-propanediol; 2-amino-2-ethyl-1,3-propanediol; tris-(hydroxymethyl)aminomethane; or piperidine. One may use enough of the olefine oxide, for instance, ethylene oxide, to convert all amino hydrogen atoms into hydroxyethyl radicals, or one may employ a greater amount so as to introduce ether linkages in addition. Soybean oil, blown soybean oil, tall oil, blown castor oil, blown teaseed oil, etc., may be used instead of castor oil in the above example.

In the above examples it is obvious that free hydroxyl radicals may be present as part of a hydroxyalkyl radical, or as part of the acyl radical of a fatty acid such as ricinoleic acid.

Some of the acylated aminoalcohols usable as ingredients in my reagents are freely dispersible in water in the free state. Presumably, such aqueous systems comprise the reagent in the form of a base, i. e., a substituted ammonium compound. In other instances, the free forms of the reagents are substantially water-insoluble, but the salt forms (e. g., the acetates) are very water-dispersible. I prefer to employ the acylated aminoalcohol in water-dispersible form. In some instances, therefore, it is desirable to neutralize the acylated aminoalcohol to produce a salt which will be water-dispersible. I have found, for example, that the acetate, hydroxyacetate, lactate, gluconate, propionate, caprate, phthalate, fumarate, maleate, benzoate, succinate, oxalate, tartrate, chloride, nitrate, or sulfate, prepared by addition of the suitable acid to the acylated aminoalcohol, usually constitutes a reagent which is somewhat more soluble or dispersible in water than the original acylated aminoalcohol. It is to be understood that references to an acylated aminoalcohol, in these specifications and claims, include the reagent in the form of salts, as well as in the free form and the hydrated form.

As an example of my preferred type of acylated aminoalcohol reagent which is effective as an ingredient in or as the composition used in my process, the following is submitted: I prepare a mixture of diamino and triamino materials which correspond essentially to either one of the two following type forms:

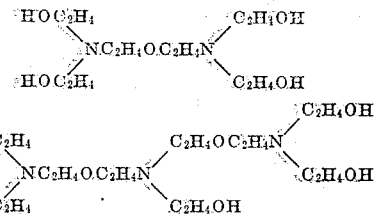

After determining the average molecular weight of such mixture, I combine the same with the ricinoleyl radical by heating it with castor oil in the proportion of 1 pound mole of castor oil for 3 pound moles of the mixed amines, "pound mole" in the latter case being calculated on the average molecular weight, as determined. Such mixture is heated to approximately 160-260° C. for approximately 6 to 25 hours, until reaction is complete, as indicated by the disappearance of all of the triricinolein present in the castor oil. Castor oil is used instead of some other source of the ricinoleyl radial, e. g., ricinoleic acid, in the example, because of its ready commercial availability and lower price.

Depending upon the choice of acylated amino body and its molecular weight, the solubility may be expected to range from ready water-solubility in the free state substantially to water-insolubility. As stated above, the salts, and specifically the acetates, generally show improved water-solubility over the simple acylated amino bodies; and I have obtained the best results by using salt forms of the acylated amino bodies which possess appreciable water-solubility.

For a number of reasons, it is usually desirable to mix the acylated aminoalcohol body with a suitable diluent before use in my process. Water is sometimes the most desirable diluent, being cheap and available. In some instances, as above noted, especially where the scale-susceptible system includes oil, I prefer to use a water-insoluble organic liquid which is capable of acting as an oil solvent, for diluent. Many materials lend themselves to this use. One of the commonest is the aromatic fraction of petroleum distillates which is quite generally found to disperse the acylated aminoalcohols. Edeleanu extract, which comprises aromatic and unsaturated compounds, is frequently found useful. In some cases, stove oil or similar petroleum distillate is usable. Oil solvents like carbon tetrachloride or carbon disulfide are usable, although their comparatively high cost militates against their use. Amylene dichloroide is sometimes a desirable material for the present purpose, as are tetrachloroethane, tetralin, trichloroethylene, benzol and its homologs, cyclohexane, etc. This component of my reagents should naturally be compatible with the other ingredient thereof; otherwise its selection is not limited. Cost and availability will influence the selection. I prefer to use aromatic petroleum solvent, as a widely available reagent of good properties and low cost, for the present use.

To prepare my reagents, when diluents are included with the acylated aminoalcohol ingredient, the components are simply mixed together in suitable proportions. The optimum proportion of each will vary, depending on its properties; but in general the resulting mixture should be homogeneous.

I also require that the finished reagent produce a relatively stable aqueous dispersion. In cases where the ingredients form thoroughly homogeneous mixtures which are not water-dispersible, the transformation of the acylated aminoalcohol component into its salt form will sometimes accomplish this purpose. In such cases, I have preferably used acetic acid to effect this neutralization.

The reagent may be employed in undiluted form, except for the dilution employed in manufacture, to deliver it in readily usable form. In such cases, the reagent as compounded is simply introduced into the pipe or apparatus from whose surface a deposit or scale of inorganic solids is to be removed or deposition thereon inhibited. In such cases, there is undoubtedly produced an aqueous dispersion of the reagent if water is present in or passing through such apparatus. Such addition of undiluted reagent into a stream containing aqueous components may be considered equivalent to introducing a previously prepared aqueous dispersion of my reagent.

In most cases, an aqueous dispersion is obtained almost spontaneously on mixing with water my reagent prepared from the acylated aminoalcohol component and preferred nonaqueous diluent. I prefer to employ such embodiments of my reagent in aqueous dispersion, because, when so employed, the components of the reagent are prevented from separating from each other by the influence of oily materials present in the pipe or apparatus to be treated.

The present reagents have certain desirable properties. For example, they have been found to be quite stable in the presence of fairly saline water and in the presence of fairly hard water, over a period ranging from at least several hours to at least several days. My reagents do not form precipitates with quite hard waters and are not "salted-out" of appreciably saline waters. Since oil field waters are commonly saline and hard, stability toward such constituents is obviously desirable in a reagent to be used in the presence of such waters.

When a water-insoluble organic liquid is employed as diluent in preparing my reagents, I prefer to employ a considerable excess of acylated aminoalcohol over what would be exactly required to effect dispersion of the water-insoluble organic liquid in water. Such excess further prevents any separation of the phases, enhancing the stability of the dispersion so that it will remain stable for at least several hours. The excess of acylated aminoalcohol also acts to lower the surface tension of the whole reagent, because of which the reagent exhibits a marked penetrating effect. In this way, it is carried into the crevices and irregularities of the deposit, weakening the bond between the deposit of inorganic solids and the supporting wall.

Where my reagents incorporate a water-insoluble liquid capable of acting as an oil solvent, the proportions of oil solvent and acylated aminoalcohol may be varied within wide limits. For example, I have prepared my reagent in one form in which it contained 4 parts of acylated aminoalcohol to 1 part of oil solvent. I have likewise prepared it in a form in which it contained 4 parts of oil solvent to 1 part of acylated aminoalcohol. Both forms were relatively stable, and did not separate appreciably into their components, on standing for protracted periods of time. I have likewise prepared my reagent in a form in which it contained 9 parts of acylated aminoalcohol and 1 part of oil solvent; and in a form in which it contained 1 part of acylated aminoalcohol and 9 parts of oil solvent. I have thereby determined that use of the acylated aminoalcohol and the oil solvent within the range of proportions, 9:1 and 1:9, is practicable, in producing my reagent. Therefore, I do not wish to be limited to the exact proportions of ingredients recited in the following example, or to those specific ingredients recited, the example given being merely illustrative.

As a preferred example of reagent, I employ a 20% dispersion of the preferred acylated aminoalcohol mentioned above, in aromatic petroleum solvent, including 2% of concentrated acetic acid in the finished reagent. I prefer to employ this reagent in the form of a dilute aqueous dispersion, of about 5% concentration. Sometimes aqueous dispersions containing as little as 1% of the reagent are fully effective. Sometimes it is desirable to introduce the reagent in the form of a more concentrated aqueous dispersion, as when additional water is expected to be encountered in the system being treated. This preferred reagent may of course be introduced in undiluted form, if desired. It has been successfully so used.

From the foregoing, it will be understood that my invention, broadly stated, consists in subjecting a deposit of inorganic solids of the kind described above to the action of a reagent of the kind described. Merely introducing my reagent continuously into a scaled-up system usually results in the more or less complete removal of the scale within a reasonable time. Agitating the reagent in the system sometimes facilitates removal of the scale deposit, as does allowing the reagent to stand in the system and "soak" it for any desired time.

The theory of the mode of operation of my process is uncertain; but the effects of applying the process are striking. Capacity of pipes and apparatus is usually promptly and markedly increased. Line pressures which have increased with deposition of the inorganic solids fall to normal within a short time; and sometimes sizeable chunks of the dislodged deposit are observed in the stream from the wells or lines, on screens inserted into such streams for purposes of observation, or even, at times, by their erosive effects on valves or other equipment downstream the deposit.

My reagents may be applied in many ways, depending on the location and character of the deposit of inorganic solids it is proposed to remove or whose deposition is to be inhibited. In the case of pipes, it is usually preferred to introduce, by means of a small proportioning pump, a continuous small stream of reagent, either undiluted or diluted as desired, upstream the deposit, until the latter is dislodged and removed. In some apparatus, it is most practicable to fill the whole with an aqueous solution or dispersion of the reagent, and allow a considerable soaking period to elapse before again pumping through the vessel. As stated above, I prefer to introduce my reagents in aqueous dispersion, and continuously, in small proportions, to inhibit or to remove inorganic solid deposits of the kind here under consideration. The essential step of my process is that my reagent is brought into contact with the deposit; and the latter is thereby caused to become dislodged from its supporting surface.

The following specific examples will illustrate typical applications of my process.

An oil well was producing oil and water. The surface flow system from the well regularly accumulated a hard scale which included an appreciable proportion of carbonates precipitated from the oil well water. The scale was a compact, adherent deposit, reaching thicknesses of ¼" or greater, in the header manifolds, trap valves, rundown lines, etc. Trap valves at the high- and low-pressure traps were favorable observation points, in that they scaled-up soonest after cleaning. General practice at this location was to produce the well as long as possible, shut down, and then remove the scale manually from all accessible locations in the system. The operation was required to be repeated at intervals of about three weeks.

My preferred reagent was introduced continuously, undiluted, into the system upstream the high-pressure trap, at the rate of 1 gallon to 1,400 barrels of water produced by the well. Inspection of accessible points, which normally scaled-up within three weeks, was made regularly from the beginning of such application of reagent. After a month, inspection showed a slight deposit of solids on the trap valves, very soft and readily removable. Three months later, the injection of reagent was still continuing, the well had never been shut down for scale removal, and there was no evidence of appreciable scale accumulation in the system.

Further to illustrate the ability of my reagents and my process to eliminate scale deposits composed of such inorganic solids, a second example will be cited. It illustrates the removal approach, rather than the inhibition or prevention approach of the previous example.

An oil well production system had accumulated scale to the point where it could handle only about 8,700 barrels of fluid daily, against a rated capacity of 12,000 barrels daily. Any attempt to increase the flow through the traps caused them to "pop" their contents of crude oil. My preferred reagent was injected at the well head, just downstream the flow bean, after preliminary inspection of the degree of scale deposition had been made. Such inspection had shown that flow valves upstream the master trap, the manifold, and also the trap discharge valve were heavily scaled. The rate of reagent feed was 1 quart to 1,500 barrels of well water. Within 5 days after introduction of my reagent had begun, sustained unrestricted flow at 12,000 barrels daily was again effected.

Re-inspection of accessible points showed some of them to be entirely free from scale deposits, points previously scaled hard. In other cases, the scale had not been entirely removed in the short time of application of my reagent; but the remaining accumulations were very soft in character.

This second example illustrates the fact that my process may be successfully applied as a scale-removing process; and the fact that incomplete removal was found at several points in the system after a short period of treatment illustrates the scale-reduction feature of my process.

In a third application of my process, I employed my preferred acylated aminoalcohol in the form of the acetate, prepared as a 15% solution in water. This material was introduced without further dilution into a pipe carrying oil and water, as in the preceding two examples. Such introduction effectively inhibited the accumulation of scale in such pipe.

Having thus described my invention, what I consider novel and desire to secure by Letters Patent is:

1. A process for preventing, reducing and removing the deposition of hard-water scale from the surfaces of equipment of an aqueous scale-forming media system by applying to the aqueous scale-forming media system a reagent comprising an acylated derivative of a basic aminoalcohol, the parent aminoalcohol having the formula:

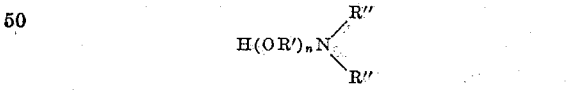

said derivative being such that there is at least one occurrence of the radical RCO, which is the acyl radical of a monocarboxy detergent-forming acid having at least 8 and not more than 32 carbon atoms; the amino nitrogen atom is basic; R" is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; and $n$ is a small whole number varying from 1 to 10.

2. A process for preventing, reducing and removing the deposition of hard-water scale from the surfaces of equipment of an aqueous scale-forming media system by applying to the aqueous scale-forming media system a reagent comprising an acylated derivative of a basic aminoalcohol, the parent aminoalcohol having the formula:

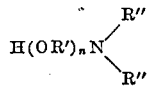

said derivative being such that there is at least one occurrence of the radical RCO, which is the acyl radical of a monocarboxy detergent-forming acid having at least 8 and not more than 32 carbon atoms; the amino-nitrogen atom is basic; R'' is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkylene oxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 4 carbon atoms; and $n$ is a small hole number varying from 1 to 10.

3. The process of claim 2, wherein the acylated aminoalcohol contains more than one basic amino nitrogen atom.

4. The process of claim 2, wherein the acylated aminoalcohol contains at least 2 and not more than 4 basic amino nitrogen atoms and at least one free hydroxyl radical.

5. The process of claim 2, wherein the acylated aminoalcohol contains at least 2 and not more than 4 basic amino nitrogen atoms, a plurality of free hydroxyl radicals, and at least one ether radical.

6. The process of claim 2, wherein the acylated aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; and wherein RCO is a higher fatty acid acyl radical.

7. The process of claim 2, wherein the acylated aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; and wherein RCO is an unsaturated higher fatty acid acyl radical having 18 carbon atoms.

8. The process of claim 2, wherein the acylated aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once, is an unsaturated higher fatty acid acyl radical having 18 carbon atoms; and wherein the value of $n$ is unity.

9. The process of claim 2, wherein the acylated aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once, is an unsaturated higher fatty acid acyl radical having 18 carbon atoms; wherein the value of $n$ is unity and R' is an alkylene radical having at least 2 and not more than 3 carbon atoms; and wherein the molecular weight is less than 1,000.

10. The process of claim 2, wherein the acylated aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once, is a ricinoleyl radical; wherein the value of $n$ is unity and R' is an alkylene radical having at least 2 and not more than 3 carbon atoms; and wherein the molecular weight is less than 1,000.

11. The process of claim 2, wherein the acylated aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once, is an oleyl radical; wherein the value of $n$ is unity and R' is an alkylene radical having at least 2 and not more than 3 carbon atoms; and wherein the molecular weight is less than 1,000.

12. A process for preventing, reducing and removing the deposition of hard-water scale from the surfaces of equipment of an aqueous scale-forming media system by applying to the aqueous scale-forming media system a reagent comprising a mixture of (a) an acylated derivative of a basic aminoalcohol, the parent aminoalcohol having the formula:

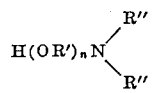

said derivative being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 10 carbon atoms; and $n$ is a small whole number varying from 1 to 10; RCO being a substituent for a hydroxyl hydrogen atom; and the molecular weight of said compound being at least 273 and not over 4,000; and (b) a water-insoluble oil solvent; the proportions of (a) and (b) lying between 1 to 9 and 9 to 1.

13. A process for preventing, reducing and removing the deposition of hard-water scale from the surfaces of equipment of an aqueous scale-forming media system by applying to the aqueous scale-forming media system a reagent comprising a mixture of (a) an acylated derivative of a basic aminoalcohol, the parent aminoalcohol having the formula:

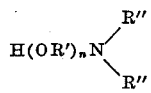

said derivative being such that there is at least one occurrence of the radical RCO, which is the acyl radical of a monocarboxy detergent-forming acid having at least 8 and not more than 32 carbon atoms; the amino-nitrogen atom is basic; R'' is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkylene oxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 4 carbon atoms; and $n$ is a small whole number varying from 1 to 10; RCO being a substituent for a hydroxyl hydrogen atom; and the molecular weight of said compound being at least 273 and not over 4,000; and (b) a water-insoluble oil solvent; the proportions of (a) and (b) lying between 1 to 9 and 9 to 1.

14. The process of claim 13, wherein the acylated aminoalcohol contains more than one basic amino nitrogen atom.

15. The process of claim 13, wherein the acylated aminoalcohol contains at least 2 and not more than 4 basic amino nitrogen atoms and at least one free hydroxyl radical.

16. The process of claim 13, wherein the acylated aminoalcohol contains at least 2 and not more than 4 basic amino nitrogen atoms, a plurality of free hydroxyl radicals, and at least one ether radical.

17. The process of claim 13, wherein the acylated aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; and wherein RCO is a higher fatty acid acyl radical.

18. The process of claim 13, wherein the acylated aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; and wherein RCO is an unsaturated higher fatty acid acyl radical having 18 carbon atoms.

19. The process of claim 13, wherein the acylated aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once, is an unsaturated higher fatty acid acyl radical having 18 carbon atoms; and wherein the value of $n$ is unity.

20. The process of claim 13, wherein the acylated aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once, is an unsaturated higher fatty acid acyl radical having 18 carbon atoms; wherein the value of $n$ is unity and R' is an alkylene radical having at least 2 and not more than 3 carbon atoms; and wherein the molecular weight is less than 1,000.

21. The process of claim 13, wherein the acylated aminoalcohol contains at least 2 and not more than 4 basic amino nitrogen atoms, a plurality of free hydroxyl radicals, and at least one ether radical in a position other than part of the divalent linking radical which unites RCO with the nearest basic amino nitrogen atom; wherein RCO, occurring only once, is a ricinoleyl radical; wherein the value of $n$ is unity and R' is an alkylene radical having at least 2 and not more than 3 carbon atoms; and wherein the molecular weight is less than 1,000.

22. A process for preventing, reducing, and removing the deposition of hard-water scale from the surfaces of equipment of an aqueous scale-forming media system by applying to the aqueous scale-forming media system a reagent comprising a basic acylated polyaminoalcohol; the parent polyaminoalcohol being a member of the class consisting of

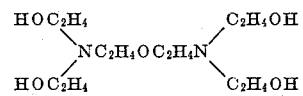

and

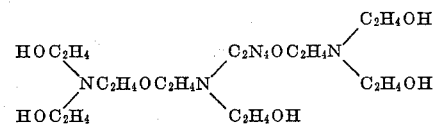

in which one hydroxyl hydrogen atom has been replaced by the ricinoleyl radical.

LOUIS T. MONSON.

REFERENCES CITED

The following references are of record in the file of this patent:

UNITED STATES PATENTS

| Number | Name | Date |
|---|---|---|
| 2,240,957 | Munz | May 6, 1941 |
| 2,400,543 | Denman | May 21, 1946 |
| 2,408,527 | Monson | Oct. 1, 1946 |
| 2,442,768 | Gunderson | June 8, 1948 |
| 2,470,830 | Monson | May 24, 1949 |